United States Patent
Nishi et al.

(10) Patent No.: US 8,360,088 B2
(45) Date of Patent: Jan. 29, 2013

(54) FUEL CUTOFF VALVE

(75) Inventors: Hiroshi Nishi, Aichi-ken (JP); Hiroaki Kito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 554 days.

(21) Appl. No.: 12/585,167

(22) Filed: Sep. 8, 2009

(65) Prior Publication Data

US 2010/0072203 A1 Mar. 25, 2010

(30) Foreign Application Priority Data

Sep. 19, 2008 (JP) ................. 2008-240287

(51) Int. Cl.
*F16K 24/04* (2006.01)

(52) U.S. Cl. ........................................ 137/202

(58) Field of Classification Search .............. 137/202; 425/470, 577; 249/142, 175; 264/328.1
See application file for complete search history.

(56) References Cited

U.S. PATENT DOCUMENTS

| | | | | |
|---|---|---|---|---|
| 5,598,870 A * | 2/1997 | Nagino | .................. | 137/587 |
| 5,687,756 A * | 11/1997 | VanNatta et al. | ............. | 137/202 |
| 5,975,116 A * | 11/1999 | Rosas et al. | .............. | 137/315.11 |
| 6,035,883 A * | 3/2000 | Benjey | ................... | 137/202 |
| 6,941,966 B2 * | 9/2005 | Mori et al. | ................. | 137/202 |
| 6,966,330 B2 * | 11/2005 | Frohwein | ............... | 137/202 |
| 2008/0142087 A1 * | 6/2008 | Muto et al. | ................. | 137/43 |

FOREIGN PATENT DOCUMENTS

DE 197 07 841 A1 10/1997
JP A-2007-92834 4/2007

* cited by examiner

*Primary Examiner* — John K Fristoe, Jr.
*Assistant Examiner* — Hailey K Do
(74) *Attorney, Agent, or Firm* — Posz Law Group, PLC

(57) ABSTRACT

In a fuel cutoff valve 10, a casing 30 including a valve chest 33 is fastened to a cover member 20 thermally welded to an upper tank wall FTa of a fuel tank FT. A float 50 is located in the valve chest 33 of the casing 30. The casing 30 has bottomed recesses 42 formed as concaves in an outer circumferential wall of the valve chest 33, and vent holes 40 provided at respective bottom areas of the bottomed recesses 42. Each of the vent holes 40 is a through hole of a small diameter, which is determined to be sufficient for ventilation of the fuel vapor in the valve chest 33. The vent hole 40 has a short dimension by the depth of the bottomed recess 42.

2 Claims, 3 Drawing Sheets

FUEL CUTOFF VALVE

CROSS-REFERENCE TO RELATED APPLICATIONS

The present application claims the priority based on Japanese Patent Application No. 2008-240287 filed on Sep. 19, 2008, the disclosure of which is hereby incorporated by reference in its entirety.

BACKGROUND

1. Technical Field

The present invention relates to a fuel cutoff valve attached to an upper portion of a fuel tank and configured to open and close a connection conduit for connecting and disconnecting inside of the fuel tank with and from outside.

2. Description of the Related Art

In a fuel cutoff valve designed to discharge the fuel vapor out of a fuel tank, as the fuel is flowed into a valve chest for receiving a float therein in response to a variation of the fuel level during a vehicle drive or in response to a rise of the fuel level during fuel supply, the float lifts up to block the discharge of the fuel vapor. Continued fuel supply in this blockage state increases the internal pressure of the fuel tank and causes blow-off of the fuel. In order to prevent an increase of the internal pressure of the fuel tank and the resulting blow-off of the fuel, one proposed structure of the fuel cutoff valve has small-diameter vent holes formed in a casing including a valve chest as disclosed in, for example, JP-A 2007-92834.

In order to ensure the sufficient liquid tightness and the gas tightness, in attachment of the fuel cutoff valve to a fuel tank, a cover member of the fuel cutoff valve is thermally welded to an upper wall face of the fuel tank. A molten resin used for the thermal welding of the cover member may flow from the position of thermal weld. The vent hole is generally formed in the casing at a position close to the cover member. The molten resin may thus reach the periphery of the vent hole. The small-diameter vent hole pierced through a circumferential wall of the valve chest in the casing may accordingly be blocked by the molten resin. This may interfere with the smooth ventilation of the air in the valve chest.

SUMMARY

In order to solve the problem of the prior art discussed above, there would thus be a demand for preventing blockage of vent holes of a casing in a fuel cutoff valve.

The present invention accomplishes at least part of the demand mentioned above and the other relevant demands by variety of configurations and arrangements discussed below.

According to one aspect, the invention is directed to a fuel cutoff valve attached to an upper portion of a fuel tank and configured to open and close a connection conduit of connecting the fuel tank with outside by down and up motions of a float and thereby connect and disconnect the fuel tank with and from the outside. The fuel cutoff valve includes: a cover member thermally welded to an upper wall face of the fuel tank; and a casing fastened to the cover member and designed to form a valve chest of connecting the fuel tank with the connection conduit and receiving the float therein. The casing has a bottomed recess formed as a concave in an outer circumferential wall of the valve chest, and a vent hole formed in a bottom area of the bottomed recess to have a smaller diameter than a diameter of the bottom area of the bottomed recess and to ventilate the valve chest to the fuel tank.

In the fuel cutoff valve according to this aspect of the invention, the casing including the valve chest to receive the float therein has the vent hole, which is formed for ventilation of the air between the valve chest and the fuel tank. The vent hole has the small diameter and is provided in the bottom area of the bottomed recess formed as the concave in the outer circumferential wall of the valve chest. The bottomed recess is located between the position of thermally welding the cover member to the upper wall face of the fuel tank with molten resin and the opening of the vent hole. Even if the molten resin flows from the position of thermal weld, the presence of the bottomed recess keeps the molten resin therein. This arrangement effectively prevents the potential blockage of the vent hole by the molten resin used for thermally welding the cover member to the upper wall face of the fuel tank, while assuring the smooth ventilation of the air between the valve chest and the fuel tank via the vent hole.

The small-diameter vent hole formed in the bottom area of the bottomed recess has the following effects. Many components of the fuel cutoff valve including the cover member, the casing, and the float are made of a resin material, with a view to facilitating the thermal welding to the fuel tank and attaining weight reduction. The respective components of the fuel cutoff valve are molded with dies. The procedure of molding the casing with small-diameter vent holes sets a split die to form a cavity around a core die used for defining the valve chest. The split die has vent hole-forming pins used for formation of the respective vent holes. The small-diameter vent hole-forming pin is naturally used to form the small-diameter vent hole. The small-diameter vent hole-forming pin is readily bent by the pressure of resin injection into the cavity. The bent pin leads to formation of burr on the periphery of the opening of the vent hole. Troublesome removal of the burr is then required. In order to prevent the burr formation, the careful pressure control of resin injection is required to the level of ensuring no bend of the pin. This pressure control is also time-consuming. In the fuel cutoff valve according to the above aspect of the invention, the small-diameter vent hole is provided in the bottom area of the bottomed recess. This arrangement enables the length of the vent hole to be shortened by the depth of the bottomed recess. The vent hole-forming pin for molding the small-diameter vent hole accordingly has a short dimension and the high resistance (pressure resistance) against the pressure of resin injection into the die. The high pressure resistance of the vent hole-forming pin is not easily bent during injection of the resin. This prevents formation of burr on the periphery of the opening of the vent hole and simplifies the pressure control of resin injection, thus facilitating formation of the vent hole. The use of the bend-resistant, short-dimensional pin for formation of the vent hole effectively prevents the burr formation and enhances the dimensional accuracy of the vent hole. The fuel cutoff valve according to the above aspect of the invention has the vent hole of the high dimensional accuracy. This arrangement stabilizes the amount of air ventilation and effectively prevents the blow-off of the fuel.

In one preferable application of the fuel cutoff valve according to the above aspect of the invention, the bottom area of the bottomed recess includes a vent hole surrounding site surrounding the vent hole and a recess inner circumferential wall site around the vent hold surrounding site, and the recess inner circumferential wall site is designed to have a less wall thickness than a wall thickness of the vent hole surrounding site. In the process of resin injection, when the flow of the molten resin reaches the periphery of the small-diameter, short-dimensional pin or the vent hole surrounding site, the recess inner circumferential wall site of the less wall thickness around the vent hole surrounding site effectively restricts the flow of the molten resin. This arrangement desirably reduces the force of the molten resin, which reaches the periphery of the pin, applied to the pin, thus effectively preventing a bend of the pin and further enhancing the dimensional accuracy of the vent hole.

DESCRIPTION OF THE PREFERRED EMBODIMENTS

Figure 1:
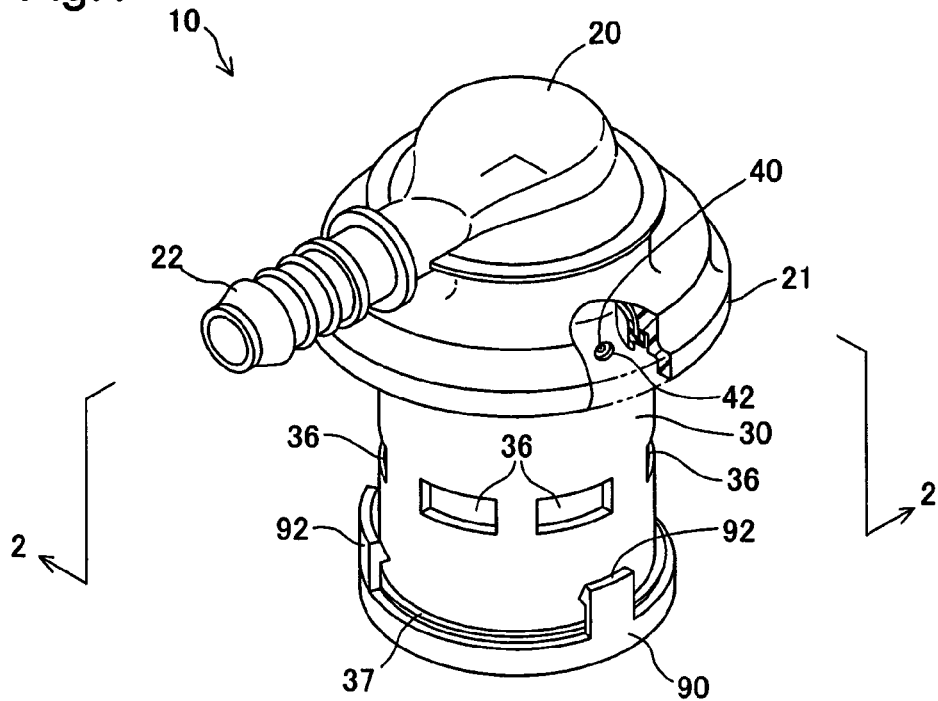
FIG. 1 is a perspective view schematically showing the appearance of a fuel cutoff valve 10 in one embodiment of the invention.
Figure 2:
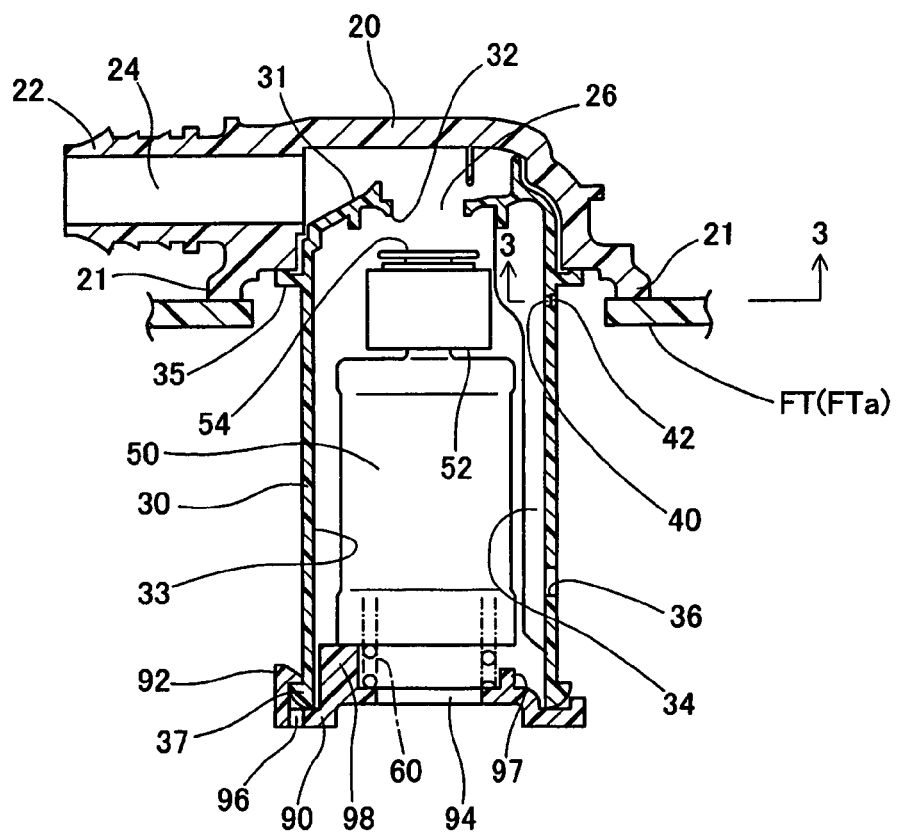
FIG. 2 is an explanatory view showing a vertical section of the main part of the fuel cutoff valve 10, taken on a 2-2 line of FIG. 1.
Figure 3:
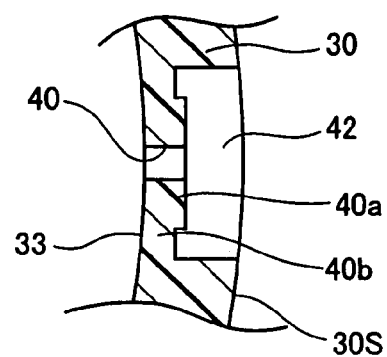
FIG. 3 is an enlarged cross sectional view showing a casing 30, taken on a 3-3 line of FIG. 2.

In order to clarify the structures, the features, the characteristics, and the functions of the invention, some modes of carrying out the invention are described below with reference to the accompanied drawings. FIG. 1 is a perspective view schematically showing the appearance of a fuel cutoff valve 10 in one embodiment of the invention. FIG. 2 is a vertical sectional view showing the main part of the fuel cutoff valve 10, taken on a 2-2 line of FIG. 1. FIG. 3 is a cross sectional view showing a casing 30, taken on a 3-3 line of FIG. 2.

As illustrated, the fuel cutoff valve 10 is attached to an upper portion of a fuel tank FT. The fuel tank FT is made of a composite resin material containing polyethylene in its outer surface layer and has a mounting hole FTb formed in an upper tank wall FTa to receive the fuel cutoff valve 10 inserted and fitted therein. As the fuel cutoff valve 10 is set in the mounting hole FTb, a lower end section 21 of a cover member 20 is thermally welded to the upper tank wall FTa and a casing 30 is located inside the fuel tank FT. The fuel cutoff valve 10 prevents the outflow of fuel from the fuel tank FT into a canister in a tilted orientation of or during rocking of the vehicle body, while blocking the fuel vapor at the time of fuel supply to or close to a full level.

The fuel cutoff valve 10 includes the cover member 20 located outside the fuel tank FT, the casing 30, a float 50, a spring 60, and a bottom cover 90. The casing 30 is fastened to a lower end of the cover member 20. In the structure of this embodiment, the respective components other than the spring are made as resin molded objects.

The cover member 20 has a joint tube 22 protruded sideward to connect with piping from the canister (not shown). A space extended from the inside of the joint tube 22 to a lower portion of the cover member 20 defines a cover-side conduit 24. The cover-side conduit 24 communicates with a valve chest 33 of the casing 30 (discussed later) via a connection conduit 26 formed at a substantial center position of the cover member 20. The connection conduit 26 accordingly connects the fuel tank FT or more specifically the inside of the fuel tank FT with the canister outside of the fuel tank FT.

The casing 30 is a cylindrical body with open upper and lower ends. A center space of a casing ceiling wall 31 defines the connection conduit 26. The casing 30 includes a ring-shaped lip 32 protruded from a lower end periphery of the connection conduit 26. A space below the casing ceiling wall 31 forms the valve chest 33. The valve chest 33 connects the inside of the fuel tank FT with the connection conduit 26. The casing 30 has projections 34 vertically extended along an inner circumferential wall of the valve chest 33 and arranged at equal pitches. The projections 34 decrease the contact area of the inner circumferential wall of the valve chest 33 and guide the sinking and floating motions or the slide up and down motions of the float 50. The casing 30 also includes a fixation flange 35, vent holes 40, bottomed recesses 42, circumferential wall inflow holes 36, and a lower end opening fitting element 37 arranged sequentially from the side of the casing ceiling wall 31. The fixation flange 35 is joined with a base of the lower end section 21 of the cover member 20 and is thermally welded to the base by laser radiation. This integrates the cover member 20 with the casing 30. The circumferential wall inflow holes 36 are formed to allow the inflow of the fuel from the casing side wall, as well as the inflow of the fuel from the bottom cover 90 as discussed later. The lower end opening fitting element 37 engages with fitting claws 92 of the bottom cover 90 provided to close the valve chest 33 and thereby fastens the bottom cover 90 to the casing 30. The vent holes 40 are formed as small-diameter through holes arranged concentrically with the bottomed recesses 42 at equal pitches (at pitches of 180 degrees in the embodiment) on the circumferential wall of the valve chest 33. The diameter of the vent hole 40 is determined to be sufficient for ventilation of the fuel vapor in the valve chest 33. The vent holes 40 and the bottomed recesses 42 are located below the fixation flange 35 thermally welded to the lower end section 21 of the cover member 20, that is, at a joint position of the cover member 20 with the casing 30. The vent hole 40 and the bottomed recess 42 will be discussed later in detail.

The float 50 is located in the valve chest 33 of the casing 30 and receives the buoyancy varying according to the fuel level in the valve chest 33 to sink and float and thereby open and close the connection conduit 26. The float 50 is not directly involved in the scope of the present invention and is thus explained only briefly. For the good formability and the easy buoyancy control, the float 50 is constructed to have an inner float located in an outer float of a bottomed cup shape. A rubber seal member 54 is provided on a seal support member 52 on an upper end of the float 50. As the float 50 lifts up, the seal member 54 is flexibly deformed to close the connection conduit 26, when being pressed against the lip 32 formed on the circumference of the connection conduit 26. As the float 50 goes down, the seal member 54 is detached from the lip 32 to open the connection conduit 26. The seal member 54 accordingly works as a valve element to open and close the connection conduit 26.

The bottom cover 90 has the four fitting claws 92 arranged, at equal circumferential pitches along the outer circumference. The respective fitting claws 92 engage with the lower end opening fitting element 37 of the casing 30 and are set on the lower end of the casing 30. This closes the lower end of the valve chest 33 of the casing 30 to define a floating and sinking space of the float 50. A center through hole 94 and base through holes 96 in respective bases of the fitting claws 92 are provided on a bottom face of the bottom cover 90 for the inflow and the outflow of the fuel into and from the valve chest 33. A spring seat 97 and float seats 98 are protruded into the valve chest 33 from the periphery of the center through hole 94. The spring seat 97 and the float seats 98 hold and support the outer circumference of the spring 60. The spring 60 has an upper end located inside the float 50 and applies a pressing force onto the float 50. The float seats 98 are arranged at equal pitches on the periphery of the center through hole 94 to support the lower end of the float 50.

In the fuel cutoff valve 10 of the embodiment structured as discussed above, as the fuel supply to the fuel tank FT raises the fuel level to a preset level, the fuel flowed into the valve chest 33 via the center through hole 94 of the bottom cover 90 and the circumferential wall inflow holes 36 of the casing 30 applies the buoyancy to lift up the float 50. The up motion of the float 50 causes the seal member 54 at the top of the float 50 to come into contact with the lip 32 formed on the periphery of the connection conduit 26 and thereby closes the connection conduit 26. The fuel cutoff valve 10 blocks the fuel tank FT from the outside (canister) and prevents the outflow of the fuel from the fuel tank FT to the outside. As the float 50 lifts up, the spring 60 applies a pressing force onto the float 50. In response to the inflow of the fuel into the valve chest 33, the float 50 quickly lifts up to close the connection conduit 26 with good response. This increases the internal pressure of the fuel tank FT. A fuel gun detects this pressure increase to stop the fuel supply. This arrangement thus effectively prevents excessive fuel supply.

In the state of closing the connection conduit 26, the internal pressure of the fuel tank FT is applied downward via the vent holes 40 onto the float 50. The float 50 goes down in response to a decrease of buoyancy accompanied with a fall of the fuel level after closure of the connection conduit 26 by the lift-up float 50. The down motion of the float 50 opens the connection conduit 26. The fuel vapor in the fuel tank FT accordingly flows through the connection conduit 26 and the cover-side conduit 24 via the vent holes 40 and reaches the canister to lower the internal pressure of the fuel tank FT.

Figure 4:
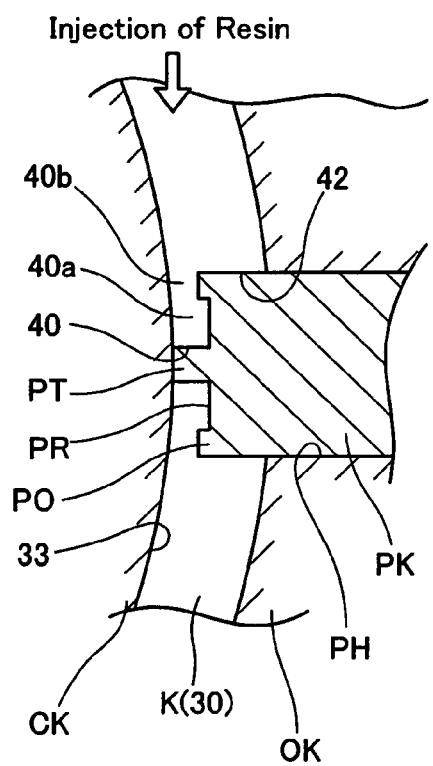
FIG. 4 is an explanatory view showing a die used for molding a vent hole 40 and a bottomed recess 42.

In the fuel cutoff valve 10 of the embodiment discussed above, the air is ventilated between the valve chest 33 and the fuel tank FT through the small-diameter vent holes 40 in response to an increase of the fuel level in the valve chest 33. As shown in FIG. 3, the vent hole 40 is located at a bottom area of the bottomed recess 42, which is a concave formed in an outer circumferential wall 30S of the valve chest 33. In the structure of the embodiment, the bottom area of the bottomed recess 42 includes a vent hole surrounding site 40a surrounding the vent hole 40 and a recess inner circumferential wall site 40b around the vent hole surrounding site 40a. The recess inner circumferential wall site 40b is designed to have a less wall thickness than a wall thickness of the vent hole surrounding site 40a. The vent hole 40 and the bottomed recess 42, as well as a die used for molding the vent hole 40 and the bottomed recess 42 is described below. FIG. 4 is an explanatory view showing the die used for molding the vent hole 40 and the bottomed recess 42.

As illustrated, the procedure of molding the casing 30 including the valve chest 33 locates an outer die OK surrounding a core die CK for formation of the valve chest 33 and forms a cavity K on the periphery of the core die CK. The outer die OK is a split die. The procedure subsequently inserts vent hole-forming pins PK into corresponding pin insertion holes PH formed in the outer die OK. A tip of the vent hole-forming pin PK forms an end pin PT having a diameter identical with a diameter of the vent hole 40. A base of the vent hole-forming pin PK has a recessed area PR and a ring-shaped area PO protruded in a ring shape on the periphery of the recessed area PR. In insertion and setting of the vent hole-forming pin PK, the end pin PT at the tip of the vent hole-forming pin PK, the recessed area PR, and the ring-shaped area PO are located in the cavity K. After completion of setting the die, the molten resin is injected from a resin inlet (not shown) into the cavity K. The injected molten resin flows over the cavity K and passes through the gap between the core die CK and the ring-shaped area PO to fill in the space between the core die CK and the recessed area PR and surround the end pin PT. After the molten resin is sufficiently cooled down in this state, the die is removed to complete the resin casing 30. The casing 30 has the vent holes 40 located in the respective bottom areas of the bottomed recesses 42 formed on the circumferential wall of the valve chest 33. The vent hole surrounding site 40a and the recess inner circumferential wall site 40b around the vent hole surrounding site 40a are formed on the periphery of the vent hole 40.

The vent hole 40 formed according to the above procedure is located in the bottom area of the bottomed recess 42 and has a short dimension by the depth of the bottomed recess 42. The end pin PT for molding the small-diameter vent hole 40 accordingly has a short dimension and the high resistance (pressure resistance) against the pressure of resin injection into the cavity K shown in FIG. 4. The high pressure resistance of the end pin PT is not easily bent during injection of the resin. This prevents formation of burr on the periphery of the opening of the vent hole 40 and simplifies the pressure control of resin injection. The prevention of burr formation desirably heightens the dimensional accuracy of the vent hole 40 formed by the bend-resistant short-dimensional end pin PT. The simple structure of forming the vent hole 40 in the bottom area of the bottomed recess 42 provides the fuel cutoff valve 10 with the easily-formed vent holes 40 of the high dimensional accuracy.

The casing 30 and the vent holes 40 have the following dimensions in the structure of the embodiment. The valve chest 33 of the casing 30 is designed to have a diameter of approximately 43φ and a circumferential wall thickness of approximately 1.7 mm. Each of the vent holes 40 is designed to have a diameter of 0.8φ and a length of 0.9 mm, which is substantially half the circumferential wall thickness of the valve chest 33. The diameter of the vent hole 40 is not restricted to this value but may be determined arbitrarily to a value sufficient for ventilation of the air in the valve chest. The length of the vent hole 40 is to be in a range of ⅓ to ⅔ of the circumferential wall thickness of the valve chest 33, in order to ensure the presence of the bottom area of the bottomed recess 42. The size of the fuel cutoff valve 10 is changed according to the capacity of the fuel tank FT. The diameter and the length of the vent holes 40 and the diameter and the depth of the bottomed recesses 42 may be varied according to the size of the fuel cutoff valve 10.

The fuel cutoff valve 10 of the embodiment has the vent holes 40 provided in the respective bottom areas of the bottomed recesses 42. The vent hole-forming pins PK used for formation of the vent holes 40 are located in the cavity K. Each of the vent hole-forming pins PK has the small-diameter, short-dimensional end pin PT, the recessed area PR at the base of the end pint PT, and the ring-shaped area PO surrounding the recessed area PR. The vent hole-forming pin PK divides the bottom area of the bottomed recess 42 into the vent hole surrounding site 40a surrounding the vent hole 40 and the recess inner circumferential wall site 40b around the vent hole surrounding site 40a. The recess inner circumferential wall site 40b is formed to have the less wall thickness than the wall thickness of the vent hold surrounding site 40a. The molten resin injected into the cavity K reaches the periphery of the small-diameter, short-dimensional end pin PT to form the vent hole 40 and the vent hold surrounding site 40a. The injected molten resin passes through the narrow gap between the core die CK and the convex ring-shaped area PO and flows into the wider space than the narrow gap (the space between the core die and the recessed area PR). The flow of the molten resin is restricted by the narrow gap between the core die Ck and the convex ring-shaped area PO. Such restriction reduces the force of the molten resin, which reaches the periphery of the end pin PT, applied to the end pin PT. This arrangement effectively prevents a bent of the end pin PT and improves the dimensional accuracy of the vent hole 40.

In the fuel cutoff valve 10 of the embodiment, the vent holes 40 and the bottomed recesses 42 are located below the fixation flange 35 provided to fasten the cover member 20, that is, at the joint of the cover member 20 with the casing 30. The vent holes 40 are accordingly formed in a neighborhood of the cover member 20, which is thermally welded to the upper tank wall FTa of the fuel tank FT, and are thus located relatively close to the upper tank wall FTa. This arrangement ensures the effective ventilation of the air between the valve chest and the fuel tank in the event of an increase in fuel level in the valve chest 33 of the casing 30 and has some other advantages discussed below.

In the process of thermally welding the lower end section 21 of the cover member 20 to the upper tank wall FTa of the fuel tank FT, the molten resin may flow from the position of thermal weld toward the vent hole 40 on the top face of the upper tank wall FTa. In the fuel cutoff valve 10 of the embodiment, while the bottomed recess 42 functions as a reservoir of the molten resin, the opening of the vent hole 40 on the outer circumference of the casing 30 is away from the position of thermally welding the cover member 20 (more specifically its lower end section 21) to the upper tank wall FTa by the depth of the bottomed recess 42. The fuel cutoff valve 10 of the embodiment thus effectively prevents blockage of the vent holes 40 by the molten resin used for thermally welding the cover member 20 to the upper tank wall FTa of the fuel tank FT, while ensuring the effective ventilation of the air via the vent holes 40 located near to the cover member 20.

Figure 5:
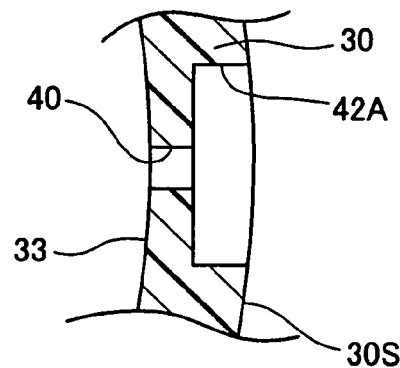
FIG. 5 is an enlarged sectional view showing the periphery of a bottomed recess 42A with the vent hole 40 in a first modified structure, as a corresponding illustration of FIG. 3.
Figure 6:
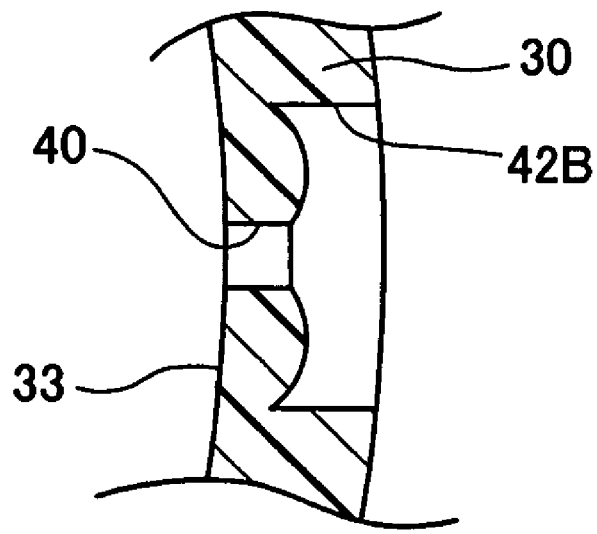
FIG. 6 is an enlarged sectional view showing the periphery of a bottomed recess 42B with the vent hole 40 in a second modified structure.
Figure 7:
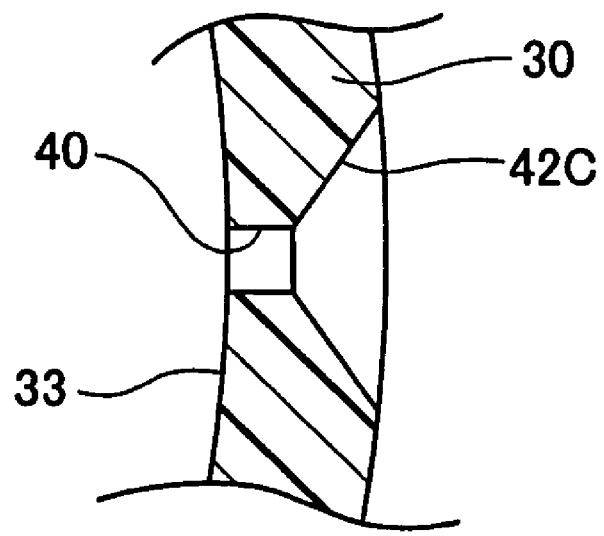
FIG. 7 is an enlarged sectional view showing the periphery of a bottomed recess 42C with the vent hole 40 in a third modified structure.

Some modified structures of the embodiment are described briefly. FIG. 5 is an enlarged sectional view showing the periphery of a bottomed recess 42A with the vent hole 40 in a first modified structure, as a corresponding illustration of FIG. 3. FIG. 6 is an enlarged sectional view showing the periphery of a bottomed recess 42B with the vent hole 40 in a second modified structure. FIG. 7 is an enlarged sectional view showing the periphery of a bottomed recess 42C with the vent hole 40 in a third modified structure. In these modified structures, the bottomed recesses 42A, 42B, and 42C have bottom areas of different shapes. The bottomed recess 42A of FIG. 5 has the vent hole 40 provided in a flat bottom area. The bottomed recess 42B of FIG. 6 has a curved bottom area formed as a convex on the periphery of the vent hole 40. The bottomed recess 42C of FIG. 7 is formed as a concave tapered from the periphery of the vent hole 40. These modified structures similarly improve the dimensional accuracy of the vent holes 40 and attain the other effects.

The embodiment and its modified examples discussed above are to be considered in all aspects as illustrative and not restrictive. There may be many other modifications, changes, and alterations without departing from the scope or spirit of the main characteristics of the present invention. For example, the fuel cutoff valve 10 of the embodiment is used as a shutoff valve to discharge the fuel vapor out of the fuel tank FT. The structure of opening and closing a flow path by down and up motions of a float is adopted not only for the fuel tank but for other suitable applications. In the structure of the embodiment, the seal member 54 comes into contact with and is detached from the lip 32 formed on the periphery of the connection conduit 26 to close and open the connection conduit 26. In one modification, a lower end of the connection conduit 26 is formed in a concave shape, while an upper end of the float 50 is formed in a convex shape. The connection conduit 26 may be closed and opened by insertion and release of the convex on the upper end of the float 50 into and from the concave on the lower end of the connection conduit 26.

The vent holes 40 and the bottomed recesses 42 are not restricted to the circular vent holes and the circular bottomed recesses but may be polygonal vent holes and polygonal bottomed recesses. The bottomed recesses 42 may otherwise have any non-circular irregular shape.

What is claimed is:

1. A fuel cutoff valve attached to an upper portion of a fuel tank and configured to open and close a connection conduit for connecting the fuel tank with outside by down and up motions of a float and thereby connect and disconnect the fuel tank with and from the outside, the fuel cutoff valve comprising:
    a cover member welded to an upper wall face of the fuel tank; and
    a easing fastened to the cover member and having a valve chest for connecting the fuel tank with the connection conduit, the valve chest receiving the float therein,
    wherein the casing has a bottomed recess with a concave shape arranged in an outer circumferential wall of the valve chest, and the casing has a vent hole formed in a bottom area of the bottomed recess that is configured to ventilate the valve chest to the fuel tank, the vent hole having a smaller diameter than a diameter of the bottom area of the bottomed recess, the bottom area of the bottomed recess includes a vent hole surrounding site surrounding the vent hole and a recess inner circumferential wall site around the vent hole surrounding site, and the recess inner circumferential wall site has a wall thickness less than a wall thickness of the vent hole surrounding site.

2. The fuel cutoff valve in accordance with claim 1, wherein the bottom area of the bottomed recess has a curved shape.

* * * * *